(12) United States Patent
Sankaranarayan et al.

(10) Patent No.: US 10,390,273 B2
(45) Date of Patent: Aug. 20, 2019

(54) ROAMING BETWEEN NETWORK ACCESS POINTS BASED ON DYNAMIC CRITERIA

(71) Applicant: Microsoft Technology Licensing, LLC, Redmond, WA (US)

(72) Inventors: Mukund Sankaranarayan, Sammamish, WA (US); Mitesh Desai, Sammamish, WA (US); Christian F. Huitema, Clyde Hill, WA (US); Paul Rosswurm, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/430,433

(22) Filed: Feb. 10, 2017

(65) Prior Publication Data

US 2018/0234900 A1 Aug. 16, 2018

(51) Int. Cl.
*H04W 36/00* (2009.01)
*H04W 36/08* (2009.01)
(Continued)

(52) U.S. Cl.
CPC ....... *H04W 36/08* (2013.01); *H04W 36/0094* (2013.01); *H04W 36/14* (2013.01); *H04W 36/36* (2013.01); *H04W 48/16* (2013.01); *H04W 48/20* (2013.01); *H04W 76/30* (2018.02); *H04W 88/06* (2013.01); *H04W 88/08* (2013.01)

(58) Field of Classification Search
CPC ...... H04W 48/16; H04W 84/12; H04W 36/36
See application file for complete search history.

(56) References Cited

U.S. PATENT DOCUMENTS 9,907,015 B2 * 2/2018 Hegde .................. H04W 48/16
2006/0165008 A1 7/2006 Li et al.
(Continued)

FOREIGN PATENT DOCUMENTS

EP 3090594 A1 11/2016
WO 2014158131 A1 10/2014

OTHER PUBLICATIONS

Nicholson, et al., "Improved Access Point Selection", In Proceedings of the 4th international conference on Mobile systems, applications and services, Jun. 19, 2006, pp. 233-245.
(Continued)

*Primary Examiner* — Melanie Jagannathan

(57) ABSTRACT

The electronic devices described herein are configured to enhance user experience associated with a network connection when transitioning the network connection between access points. Determinations to scan for available access points and transfer the network connection to an alternative access point are based on connection attributes and/or access point attributes that are compared to scan criteria and transfer criteria. Further, the scan criteria and transfer criteria are updated, or adjusted, according to machine learning techniques such that the determinations to scan for access points and transfer between access points are tuned on a per-device and/or per-user level to fit patterns of use of a particular device and/or user. Over time, the updates to the scan criteria and transfer criteria based on machine learning provide an increasingly consistent, high quality user experience while roaming efficiently between access points.

20 Claims, 7 Drawing Sheets

(51) Int. Cl.
*H04W 36/14* (2009.01)
*H04W 36/36* (2009.01)
*H04W 48/16* (2009.01)
*H04W 48/20* (2009.01)
*H04W 76/30* (2018.01)
*H04W 88/06* (2009.01)
*H04W 88/08* (2009.01)

(56) References Cited

U.S. PATENT DOCUMENTS

| | | | |
|---|---|---|---|
| 2007/0047492 A1* | 3/2007 | Kim | H04W 36/0083 370/331 |
| 2007/0058588 A1* | 3/2007 | Fashandi | H04W 36/0055 370/331 |
| 2008/0076423 A1* | 3/2008 | Lee | H04W 36/08 455/436 |
| 2010/0067379 A1 | 3/2010 | Zhao et al. | |
| 2010/0234021 A1* | 9/2010 | Ngai | H04W 36/385 455/433 |
| 2011/0286437 A1 | 11/2011 | Austin et al. | |
| 2012/0315905 A1 | 12/2012 | Zhu et al. | |
| 2013/0150012 A1* | 6/2013 | Chhabra | H04W 48/16 455/418 |
| 2013/0165144 A1 | 6/2013 | Ziskind et al. | |
| 2015/0195216 A1 | 7/2015 | Di Pietro et al. | |
| 2015/0341211 A1 | 11/2015 | Saha et al. | |
| 2016/0066252 A1* | 3/2016 | Parron | H04W 48/16 455/434 |
| 2016/0088143 A1 | 3/2016 | Cohn et al. | |
| 2016/0302128 A1 | 10/2016 | Anchan et al. | |

OTHER PUBLICATIONS

Pang, et al., "Wifi-Reports: Improving Wireless Network Selection with Collaboration", In Journal of IEEE Transactions on Mobile Computing, vol. 9, Issue 12, Jun. 22, 2009, 14 pages.

Zhou, et al., "Advances in Machine Learning: First Asian Conference on Machine Learning", In Proceedings of First Asian Conference on Machine Learning, Nov. 2, 2009, 1 page.

Chen, et al., "Power-Efficient Access-Point Selection for Indoor Location Estimation", In Journal of IEEE Transactions on Knowledge and Data Engineering, vol. 18, No. 7, Jul. 2006, pp. 877-888.

Sun, et al., "Improving Access Point Association Protocols Through Channel Utilization and Adaptive Probing", In Journal of IEEE Transactions on Mobile Computing, vol. 15, Issue No. 05, May 2016, pp. 1157-1167.

"Generation Partnership Project: Technical Specification Group Radio Access Network; User Equipment (UE) Procedures in Idle Mode and Procedures for Cell Re-selection in Connected Mode (Release 13)", In the Third Generation Partnership Project (3GPP), Mobile Competence Centre, vol. RAN WG2, Issue V13.0.0, Jan. 8, 2016, 59 Pages.

"International Search Report and Written Opinion Issued in PCT application No. PCT/US2018/016536", dated Apr. 6, 2018, 13 Pages.

* cited by examiner

ROAMING BETWEEN NETWORK ACCESS POINTS BASED ON DYNAMIC CRITERIA

BACKGROUND

Electronic devices, such as personal computers, laptops, mobile phones, and the like are increasingly equipped to make use of multiple types of access points to connection to networks and to send and receive data. For instance, many devices are equipped to make use of a wide variety of Wi-Fi networks, cellular networks, Bluetooth networks, etc. Each access point may include different associated attributes and provide different ranges, signal strengths, connection speeds, etc. Maintaining a high quality, consistent connection while roaming between different access points may be difficult.

Devices that roam between access points typically include static logic that causes a device to automatically scan for available access points and to transfer connections to detected access points when certain defined criteria or thresholds are met or exceeded. However, the static logic does not account for different patterns of use by different users, dynamic aspects of specific groups of access points, differences in device used based on time of day, etc. Users receive a "one size fits all" experience based on the static logic when each user may have a unique pattern of use for which the static logic provides a subpar experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A computerized method comprises collecting at least one connection attribute associated with a network connection to a first access point, scanning at least one alternative access point when at least one scan criterion is satisfied based on the collected at least one connection attribute, collecting scan feedback after the at least one alternative access point is scanned, and updating the at least one scan criterion based on the collected scan feedback, wherein the at least one scan criterion is updated according to machine learning.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

In FIGS. 1 to 7, the systems are illustrated as schematic drawings. The drawings may not be to scale.

DETAILED DESCRIPTION

The detailed description provided below in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'computing apparatus', 'mobile device' and the like are used herein to refer to any device with processing capability such that it can execute instructions. Those skilled in the art will realize that such processing capabilities are incorporated into many different devices and therefore the terms 'computer' and 'computing apparatus' each may include PCs, servers, laptop computers, mobile telephones (including smart phones), tablet computers, media players, games consoles, personal digital assistants, and many other devices.

The electronic devices below are configured to enhance user experience associated with a network connection when transitioning the network connection between access points. Determinations to scan for available access points and transfer the network connection to an alternative access point are based on connection attributes and/or access point attributes that are compared to scan criteria and transfer criteria. Further, the scan criteria and transfer criteria are updated, or adjusted, according to machine learning techniques such that the determinations to scan for access points and transfer between access points are tuned on a per-device and/or per-user level to fit patterns of use of a particular device and/or user. Over time, the updates to the scan criteria and transfer criteria based on machine learning provides an increasingly consistent, high quality user experience while roaming efficiently between access points.

Figure 1:
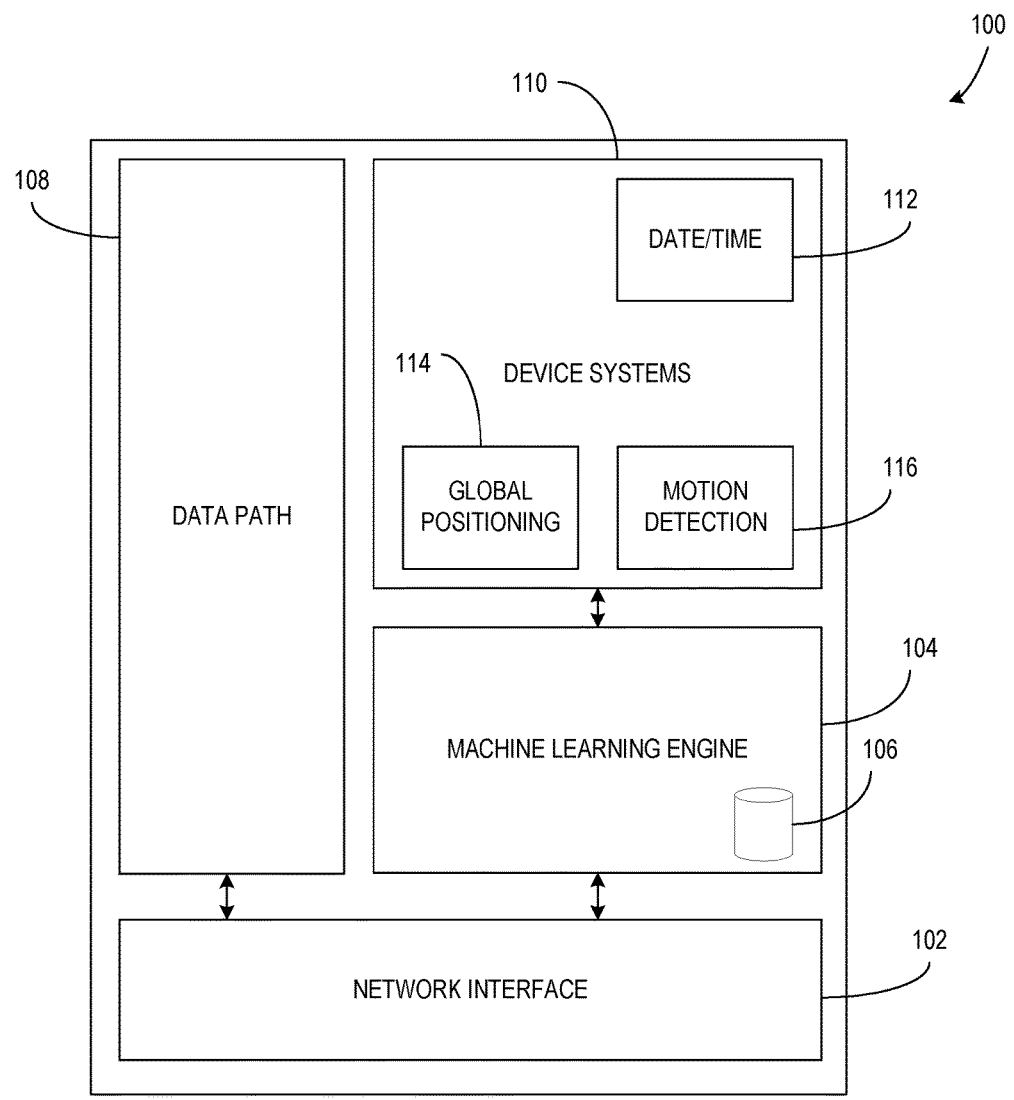
FIG. 1 illustrates a block diagram of an electronic device including a machine learning engine according to an embodiment.

FIG. 1 illustrates a block diagram of an electronic device 100 including a machine learning engine 104 according to an embodiment. The electronic device 100 comprises a network interface 102 that is communicatively coupled to the machine learning engine 104 and a data path 108. The electronic device 100 includes further device systems 110, such as a date-time component 112, a global positioning component 114, and/or a motion detection component 116.

In an example, the electronic device 100 may be a computing device or computing apparatus as described above. For instance, the electronic device 100 may include a PC, server, laptop computer, mobile telephone (including smart phones), tablet computer, media player, games console, personal digital assistant, etc.

The network interface 102 may include one or more physical interfaces for communication over networks (e.g., antennae/wireless radios for wireless communication, plugs or similar connectors for wired communication, etc.). Further, the network interface 102 may include one or more firmware and/or software interfaces for use with the one or more physical interfaces, enabling the network interface 102 to use the physical interfaces to transmit data, receive data, form connections, interpret data, etc. The network interface 102 handles data sent to and/or from other components of the electronic device 100 from and/or to other entities via communication on one or more networks.

The network interface 102 may further include a connection manager that communicates, controls, and/or interacts with other elements of the network interface 102 in order to direct communication/data traffic through physical interfaces to other entities (e.g., access points, servers, etc.) via networks.

The network interface 102 may be capable of connection to and/or communication with multiple types of network access points (e.g., Wi-Fi access points, cellular access points, etc.). The network interface 102 may be configured to determine when and/or how to detect available access points and/or when to change network communication from one available access point to another. The determinations of when to detect, or scan for, available access points and when to transfer communications or connections from one access point to another may be based on defined criteria, or thresholds, which the network interface 102 may compare against data/attributes associated with current network connection(s) (e.g., connection attributes, etc.), states of other systems within the electronic device 100, historical data associated with the network interface 102 and/or electronic device 100, and access points (e.g., access point attributes, etc.), etc. For instance, a defined scan criterion may cause the network interface 102 to scan for alternative available access points when a signal strength value (e.g., a received signal strength indicator (RSSI), etc.) of a current network connection is 50% of a maximum signal strength or less. Alternatively, or additionally, a defined transfer criterion may cause the network interface 102 to transfer a network connection from a first access point to a second access point when a network connection to the second access point would have a lower latency than the network connection to the first access point.

Scan criteria and/or transfer criteria may be based on one or more connection performance attributes (e.g., signal strength, a signal latency, a cyclic redundancy check (CRC) error rate, access point load, theoretical throughput, actual throughput, etc.). Additionally, or alternatively, scan criteria and/or transfer criteria may be based on recorded patterns of use, detected relationships between access points, date-time data, location data, detected motion data, frequency band/channel data, amount of data queued to be transmitted, etc.

Data received and/or collected by the network interface 102 via the network and/or associated with network connections/access points may be routed to the machine learning engine 104 and/or the data path 108. The machine learning engine 104 may further receive data from other device systems, such as device systems 110, as well. In an example, the machine learning engine 104 collects a variety of data as input and/or feedback and, based on the collected data, updates the criteria that cause the network interface 102 to scan for alternative available access points and/or transfer network connections from a first access point to a second access point. The machine learning engine 104 may use machine learning techniques and/or algorithms to determine adjustments to the scan criteria and/or transfer criteria that may improve aspects of scanning for available access points and transferring connections to alternative access points. Some aspects which may be targeted for improvement include reducing scanning duration, reducing typical or expected latency, increasing typical or expected throughput, and/or improving typical or expected link quality. For instance, the machine learning engine 104 may, based on a machine learning algorithm, determine that adjusting the scan criteria such that the frequency of scans for available access points is reduced may reduce interruptions of data transmissions while maintaining sufficient connection quality. Alternatively, or additionally, the machine learning engine 104 may determine that the threshold for satisfying the criteria for transferring from a first access point to a second access point should be lowered in order to reduce time spent using a poor-quality connection, thereby improving user experience. These and other predictions are contemplated.

Collected feedback data may be associated with a scanning process and/or a transfer process. The feedback collected may include connection performance attributes (e.g., signal strength, bandwidth, etc.), comparisons of current connection performance and previous connection performance (e.g., post-transfer signal quality or strength compared to pre-transfer signal quality or strength, etc.), transmission downtime during scanning or transfer, transmission downtime over a defined period, previous criterion adjustments, determined reasons for access point failure or reduced performance (e.g., why the access point failed), whether the scan or transfer was successful, etc.

In some examples, the machine learning engine 104 comprises a trained regressor such as a random decision forest, directed acyclic graph, support vector machine, neural network, or other trained regressor. The trained regressor may be trained using the input and feedback data described above. Examples of trained regressors include a convolutional neural network and a random decision forest. It should further be understood that the machine learning engine 104, in some examples, may operate according machine learning principles and/or techniques known in the art without departing from the systems and/or methods described herein.

A machine learning engine 104 is available at the electronic device 100 as shown in FIG. 1. In alternative examples, a machine learning engine may be disposed at another computing device which receives and processes the data from the electronic device 100. Where the machine learning engine 104 is at the electronic device 100, it comprises software stored in memory and executed on a processor in some cases. In some examples the machine learning engine 104 is executed on an FPGA or a dedicated chip. For example, the functionality of the machine learning engine 104 may be implemented, in whole or in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 3:
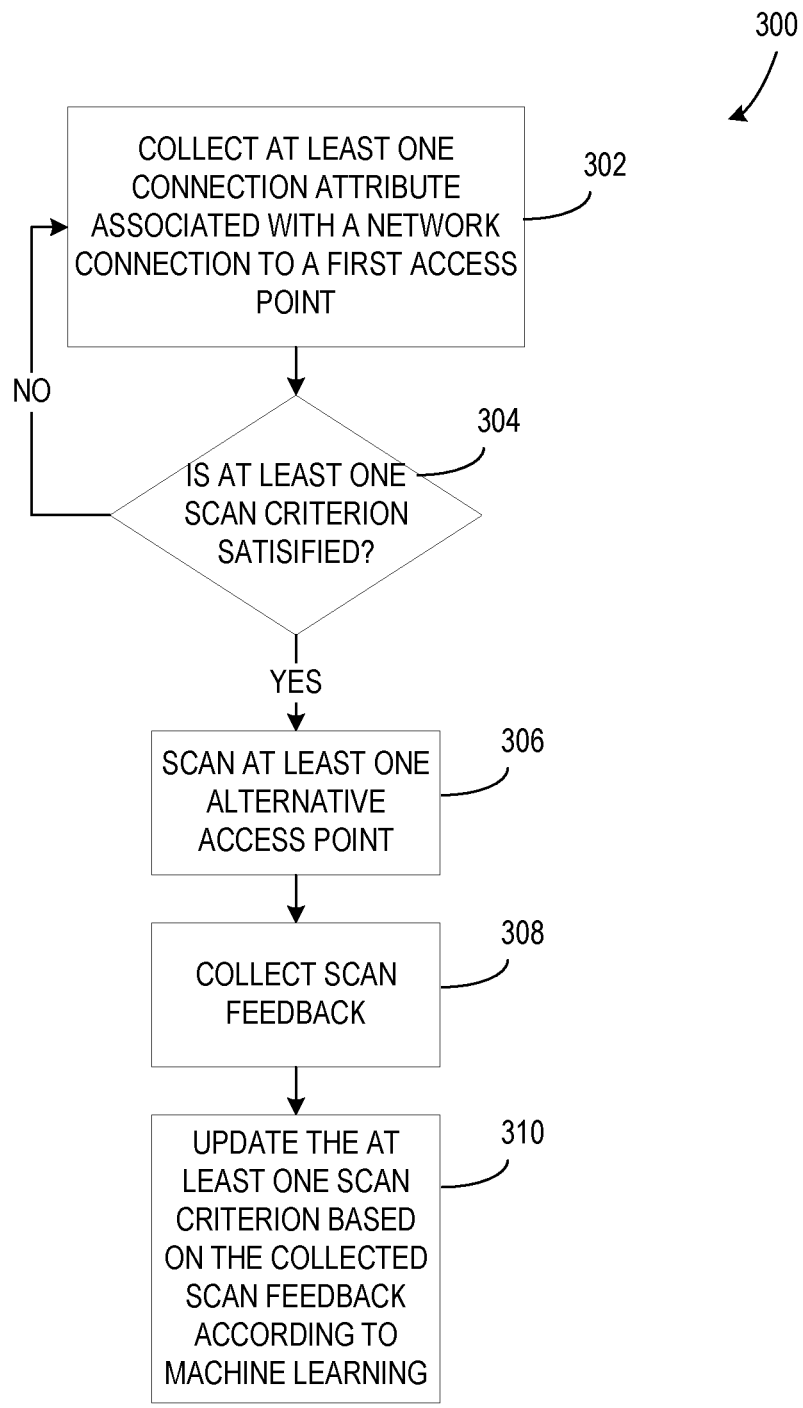
FIG. 3 illustrates a flow chart of a method of scanning an alternative access point when scan criteria are satisfied and updating the scan criteria based on scan feedback according to an embodiment.
Figure 4:
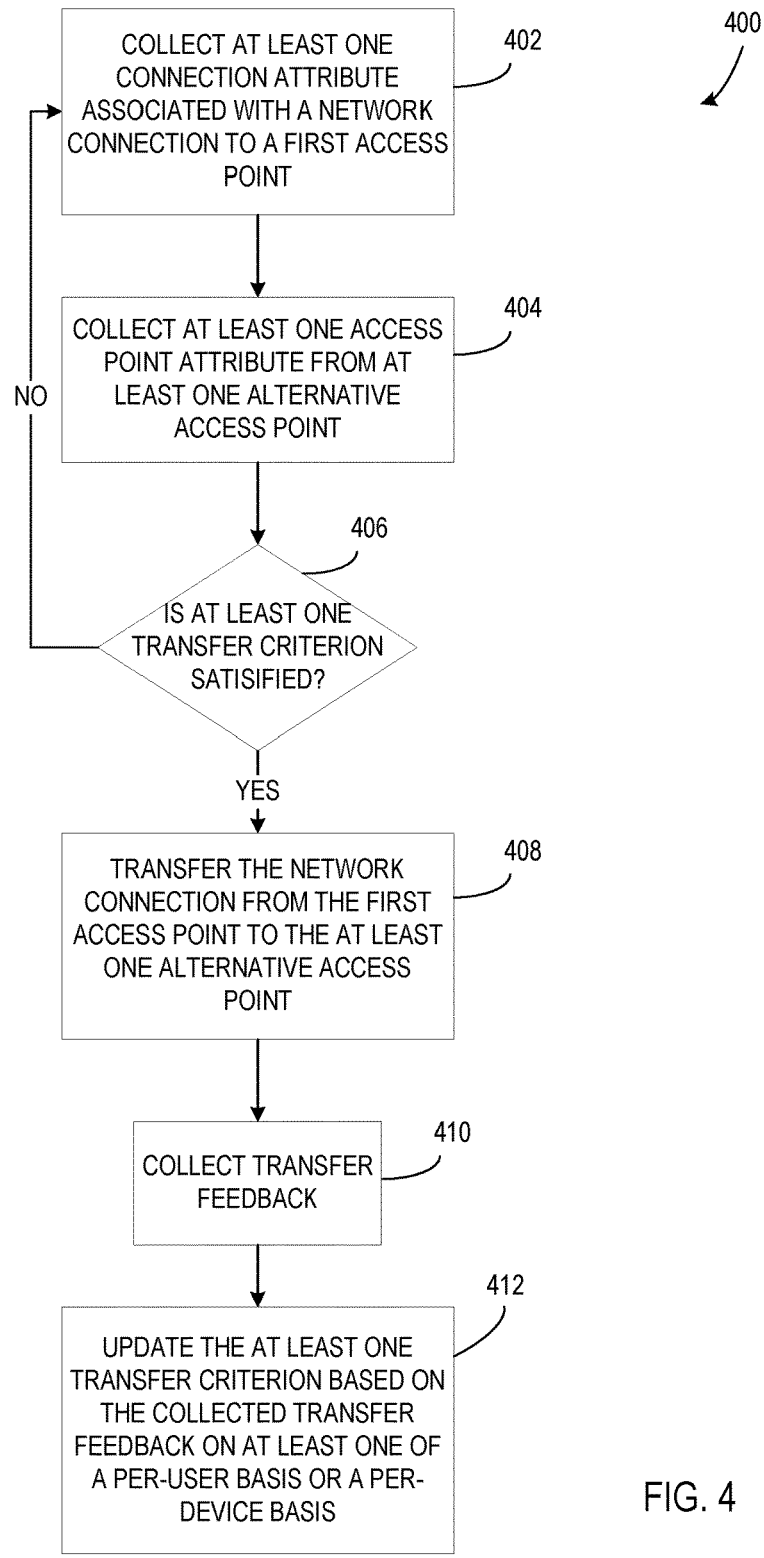
FIG. 4 illustrates a flow chart of a method of transferring a connection from a first access point to an alternative access point based on transfer criteria and updating the transfer criteria based on transfer feedback according to an embodiment.
Figure 5:
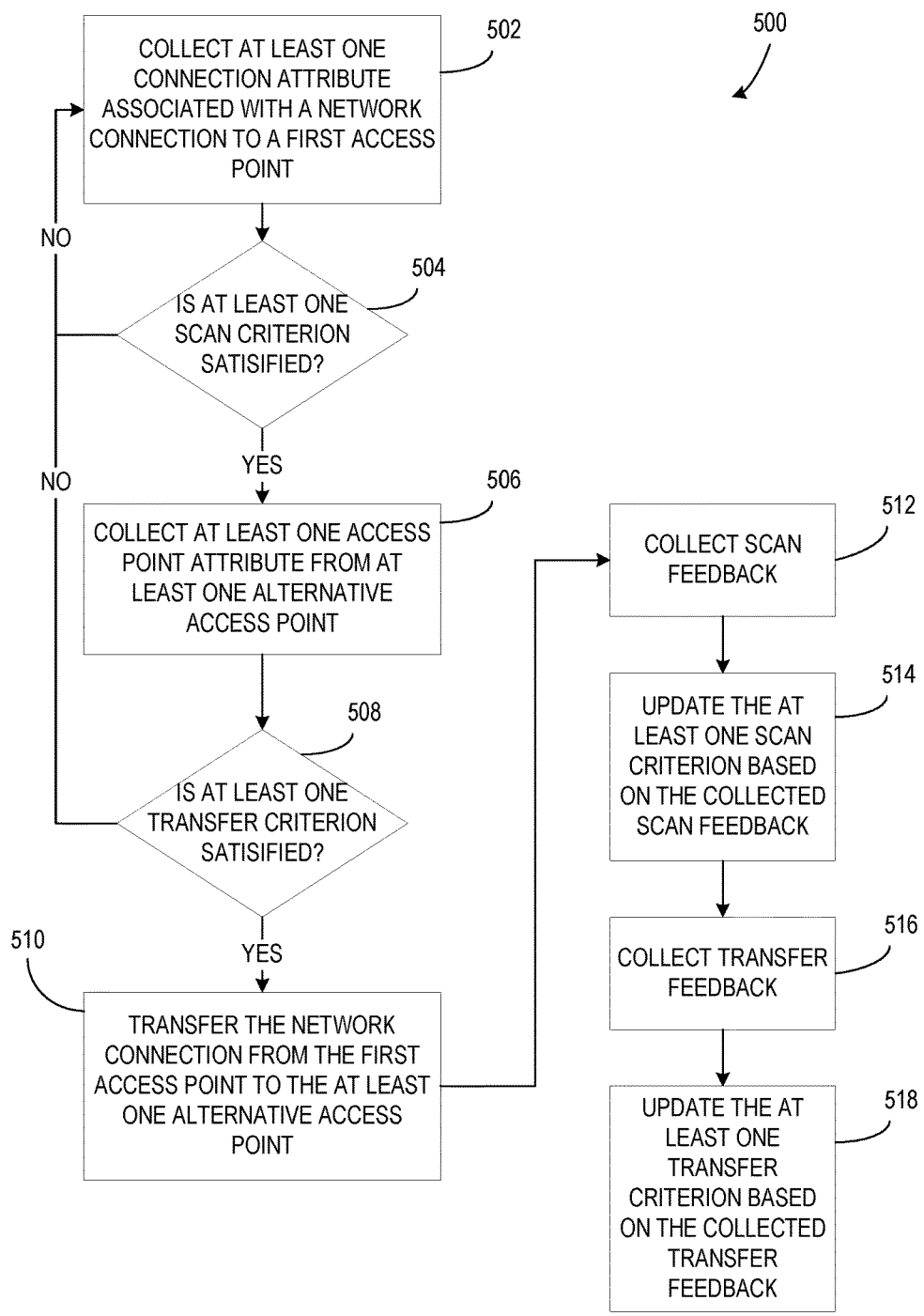
FIG. 5 illustrates a flow chart of a method of scanning alternative access points based on scan criteria, transferring a network connection to an alternative access point based on transfer criteria, and updating the scan criteria based on scan feedback and the transfer criteria based on transfer feedback according to an embodiment.

The machine learning engine 104 is arranged to execute the methods described herein with respect to FIGS. 3-5 to compute scan criteria updates and/or transfer criteria updates in a manner which allows for improved performance when scanning for and roaming between access points.

The machine learning engine may make use of training data pairs when applying machine learning techniques and/or algorithms. Millions of training data pairs (or more) may be stored in a machine learning data structure (e.g., machine learning data structure 106, etc.). In some examples, a training data pair includes an input or feedback data value paired with a criteria update value. The pairing of the two values demonstrates a relationship between the input or feedback data value and the criteria update value that may be used by the machine learning engine 104 to determine future criteria updates according to machine learning techniques and/or algorithms.

The scan criteria and/or transfer criteria that are established by the machine learning engine 104 may be associated with the specific electronic device 100. Alternatively, or additionally, the scan criteria and/or transfer criteria may be associated with a particular user of the electronic device 100. For instance, over time, the machine learning engine 104 may establish criteria based on patterns of usage associated with specific users. When a first user is signed in to the electronic device 100 or otherwise identified as currently using the device 100, criteria associated with the first user may be used by the network interface 102 when determining whether to scan for access points and/or transfer connections between access points. When a second user begins to use the electronic device 100, different criteria associated with the second user may then be used.

The machine learning engine 104 may store, in a machine learning data structure 106, input data/attributes, feedback data, current scan and transfer criteria, past scan and transfer criteria, past scan records, past connection transfer records, etc. The data stored in the machine learning data structure 106 may be used by the machine learning engine 104 when applying machine learning techniques/algorithms to evaluate feedback and update defined scan and transfer criteria.

The data collected by the machine learning engine 104 may include state data and/or attributes of device systems 110, including a date-time component 112, a global positioning component 114, and/or a motion detection component 116 (e.g., accelerometer(s), etc.). The data collected by the machine learning engine 104 from these device systems 110 may be used by the machine learning engine 104 to determine patterns of use of the electronic device 100 that are dependent on day of the week/month, time of day, global location, sustained motion, etc. The determined patterns of use may be used to establish scan criteria and/or transfer criteria that depend on the location of the electronic device, etc. For instance, these dynamic criteria may cause the network interface 102 of the electronic device 100 to behave differently when determining whether to scan for access points or transfer a connection between access points depending on whether the electronic device 100 is close to home or in an unknown location, or whether it's in the middle of the day or night.

Criteria (scan criteria or transfer criteria) may be based on detected relationships between access points. For instance, if a connection has been successfully transferred from a first access point to a second access point frequently in the past, the transfer criteria may be configured such that a transfer to the second access point is more likely than a transfer to another available access point when it is necessary to transfer away from the first access point. Alternatively, the transfer criteria may be configured such that transfers to other available access points are attempted before attempting a transfer to a second access point when there is a history of failed or poor-quality transfer from the first access point to the second access point.

It should further be understood that input and/or feedback data, criteria updates, patterns of use, and other data that may be collected by the machine learning engine 104 and/or other components of the electronic device 100 may be recorded on and/or shared with other devices. For instance, a cloud server may collect the machine learning engine data from the engine 104 and the collected data may be used to improve criteria used by other electronic devices. Many devices with machine learning engines may provide machine learning engine data to the cloud server where the data is analyzed such that future criteria may be improved. For instance, the data may be used to improve on the default criteria that a network interface on a new electronic device uses when scanning for access points and/or transferring between access points.

Scanning for available access points may include a plurality of scan types (e.g., Wi-Fi scan, specific frequency channel scan, cellular network scan, a known access point scan, etc.). The plurality of scan types may be arranged, ranked, prioritized, or ordered based on aspects and/or attributes of the scan types. The use of different prioritized scan types may for scan patterns which may be used during scanning to maximize the likelihood of detecting an access point of sufficient quality at a minimum scan cost. For instance, a first scan type may be cheaper, faster, more reliable, or otherwise more efficient than a second scan type and the first scan type may be prioritized over the second scan type. Alternatively, or additionally, a first scan type may be associated with one or more preferred access points while a second scan type may not be associated with one or more preferred access points. The first scan type may be prioritized over the second scan type to prioritize the associated preferred access points. It should be understood that scan criteria, as updated according to machine learning techniques, may cause scan order or priority, or the scan pattern, to change over time. For instance, a scan of known access points (e.g., access points that have been successfully used in the past, etc.), as defined by scan criteria, may change dynamically as new access points are successfully used and included in the set of known access points. As the scan criteria are updated, the new known access points may be scanned at a higher priority than before they were known access points.

Two or more access points may have an affinity or correspondence, in that, when one of the access points is detected in a scan, the corresponding access points are also detected. Based on a historical correspondence pattern, scan criteria may be updated such that, when network interface is connected to an access point, scanning for corresponding access points is prioritized.

Access points may provide a "neighborhood map" of other access points within a certain range. The scan criteria may be configured by the machine learning engine to prioritize scanning of access points in the "neighborhood map" because of a high likelihood that the neighborhood access points may be available.

Access points that are detected during scanning may be arranged, ranked, prioritized, or ordered. Access points may be arranged based on cost, probable performance, past patterns of use, past reliability, etc. For instance, a first access point that has been used successfully on multiple occasions in the past may be prioritized over a second access point that has never been used. Alternatively, or additionally, an access point that offers free data transmission (e.g., a Wi-Fi router at a user's home, etc.) may be prioritized over an access point that offers costed data transmission (e.g., a cellular access point, etc.). The priority of the access points may determine an order in which the network interface 102 attempts connection transfers to the access points, such that the highest priority access point may be targeted for a connection transfer first. If a connection transfer fails for an access point, the next highest priority access point may be tried. Similar to the scan prioritization described above, adjustments of transfer criteria by the machine learning engine may affect the rank and/or priority of access points when transferring a connection.

Access points or groups of access points may be associated with separate transfer criteria, such that transfer criteria for one access point may be satisfied while transfer criteria for another access point may not be satisfied. For instance, transfer criteria for a high priority access point may be easier to satisfy, reflecting that the high priority access point is likely to provide a reliable connection, while transfer criteria for a lower priority access point may be more difficult to satisfy, reflecting that the lower priority access point may be less likely to provide a connection that is an improvement on the connection of the current access point.

The machine learning engine 104 is configured to update criteria to balance collecting data in order to determine a best scan and/or connection transfer against the resource cost of doing so. Collecting data by scanning for access points and transferring connections to other access points may cause downtime with respect to actual transmission of data. So, the machine learning engine 104 may be configured to adjust criteria such that an access point that provides a connection of sufficient quality is found efficiently.

The machine learning engine 104 and network interface 102 operate as described above with no input or direct interaction from a user of the electronic device 100. However, in an alternative example, a user of the electronic device 100 may provide input and/or feedback that may be used by the machine learning engine 104. For instance, the user may provide a rating of the performance of a network connection of the electronic device 100 around a time when the network interface is scanning for alternative access points and/or transferring a connection to an alternative access point.

The data path 108 represents the modules and/or components that may make up a general path or flow of data in a computing device. For example, the data path 108 may include layers of a transmission control protocol/internet protocol (TCP/IP) stack, applications, interfaces, and the like. It should be understood that the data path encompasses other layers, locations, and/or components of the electronic device 100 where data being sent and received over the network interface 102 may originate and/or be bound.

The electronic device 100 comprises at least one network interface 102 comprising a first network connection to a first access point, at least one processor, and at least one memory comprising computer program code. The processor executes the computer program code to perform the operations illustrated in the flow charts. For example, the computer program code is executed to collect at least one connection attribute associated with the first network connection. The code further scans a second access point when at least one scan criterion is satisfied based on the collected connection attribute. Scanning the second access point includes collecting at least one access point attribute from the second access point. The code further disconnects the first network connection from the first access point and forms a second network connection from the network interface to the second access point when at least one transfer criterion is satisfied based on at least one of the collected connection attribute or the collected access point attribute from the second access point. The code further updates the scan criterion based on scan feedback associated with scanning the second access point, and updates the transfer criterion based on transfer feedback associated with the disconnecting of the first network connection.

In some examples, machine learning is employed. For example, updating the scan criterion includes updating the scan criterion according to machine learning, and updating the transfer criterion includes updating the transfer criterion according to machine learning.

The machine learning enables the updates to be per-user and/or per-device. For example, updating the scan criterion includes updating the scan criterion on a per-user basis and/or a per-device basis. Updating the transfer criterion includes updating the transfer criterion on a per-user basis and/or a per-device basis.

The connection attribute includes at least one of a signal strength, a signal latency, a CRC error rate, connected access point load, throughput, transport layer statistics, application layer statistics, or a pattern of use. The pattern of use includes at least one of date-time data, GPS location data, or accelerometer movement data. The access point attribute from the second access point includes at least one of a signal strength, a signal latency, a CRC error rate, or a pattern of use. The scan feedback and the transfer feedback include at least one of post-transfer signal quality, transmission downtime, previous criterion adjustments, scan duration, throughput latency, transport layer statistics, application layer statistics, or at least one determined reason for access point failure.

On the electronic device 100, the second access point may be associated with the first access point based on a recorded history of the electronic device transferring network connections between the first access point and the second access point.

Figure 2:
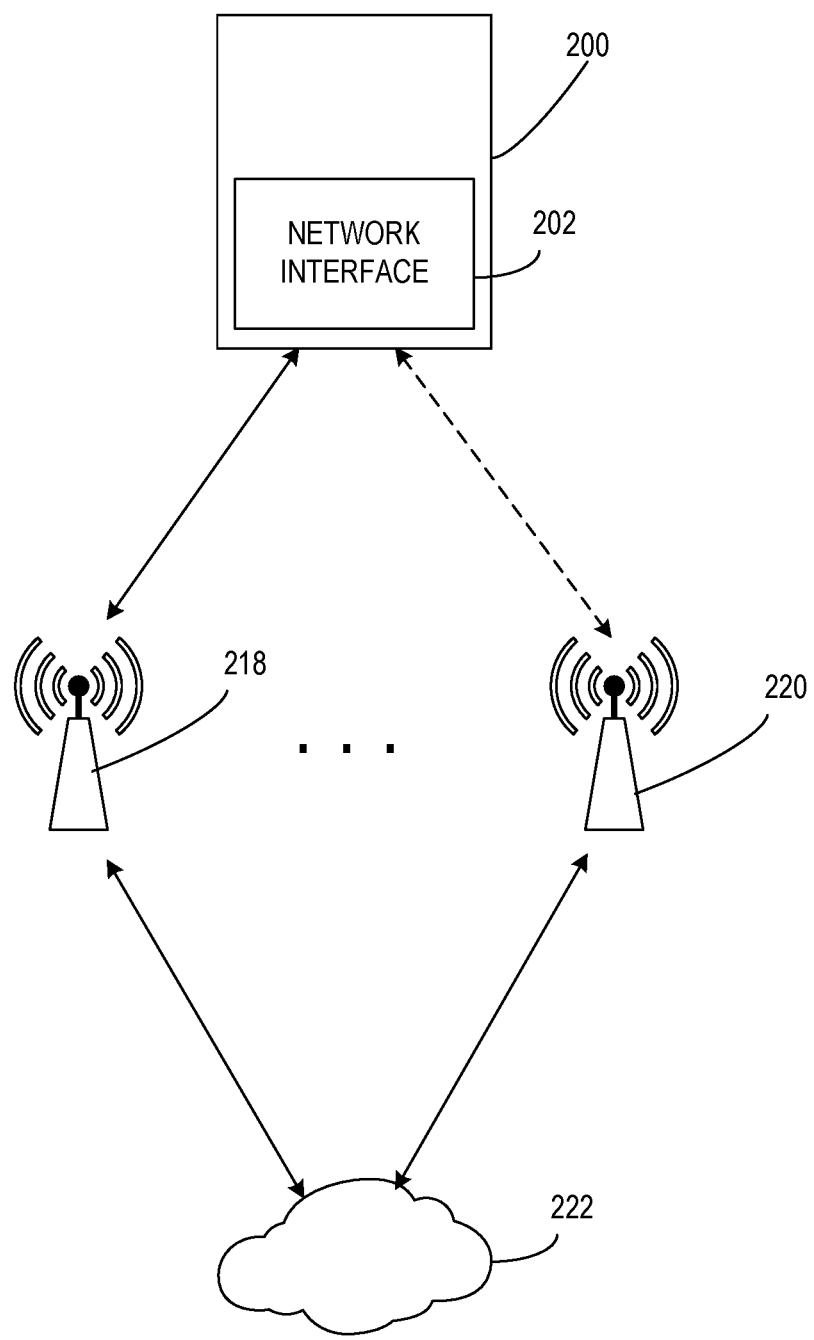
FIG. 2 illustrates a block diagram of an electronic device positioned in range of a plurality of network access points according to an embodiment.

FIG. 2 illustrates a block diagram of an electronic device 200 positioned in range of a plurality of network access points, including access points 218 and 220, according to an embodiment. The electronic device 200 includes a network interface 202 that has a network connection routing through the access point 218 to the network 222. The network interface 202 is further in range of at least one other access point 220. It should be understood that, in an example, there may be more available access points in range as well, as illustrated by the " . . . " between access point 218 and access point 220. Both access points 218 and 220 are capable of providing connectivity to the network 222. In an example, the network 222 may be an intranet, the Internet, or the like.

The network interface 202, while connected via the access point 218, may scan for available access points and detect the access point 220. Further, the network interface 202 may transfer the network connection to the network 222 from routing over the access point 218 to routing over the access point 220. It should be understood that the transfer of the network connection may include disconnecting the network connection routing over the access point 218 and forming a similar network connection that routes over the access point 220, or other similar and/or known techniques for transferring and/or rerouting network connections.

FIG. 3 illustrates a flow chart of a method 300 of scanning an alternative access point when scan criteria are satisfied and updating the scan criteria based on scan feedback according to an embodiment.

The example method 300 comprises collecting, at 302, at least one connection attribute associated with a network connection to a first access point. At 306, at least one alternative access point is scanned when, at 304, at least one scan criterion is satisfied based on the collected connection attribute. Scanning the alternative access point includes scanning a plurality of alternative access points according to a scan pattern. Scanning according to the scan pattern may include scanning the plurality of alternative access points in a ranked order. The ranked order arranges the plurality of alternative access points from a least expensive cost access point to a most expensive cost access point, in some examples. In other examples, the ranked order arranges the plurality of alternative access points from a most reliable access point to a least reliable access point. A reliability of an access point of the plurality of alternative access points is determined based on a usage history of the access point.

At 308, scan feedback is collected after the alternative access point is scanned. At 310, the scan criterion is updated based on the collected scan feedback (e.g., via machine learning). Updating the scan criterion based on the collected scan feedback includes updating the scan pattern based on the collected scan feedback. In some examples, updating the scan criterion includes updating the scan criterion on a per-user basis or a per-device basis.

It should be understood that, at 304, when no scan criterion is satisfied, the method may return to collecting connection attributes at 302.

FIG. 4 illustrates a flow chart of a method 400 of transferring a connection from a first access point to an alternative access point based on transfer criteria and updating the transfer criteria based on transfer feedback according to an embodiment.

The method 400 comprises collecting, at 402, at least one connection attribute associated with a network connection to a first access point. At 404, at least one access point attribute is collected from at least one alternative access point. The access point attribute includes at least one of a signal strength, a signal latency, a CRC error rate, or a pattern of use. The access point attribute may include, alternatively or in addition, a pattern of use. An example pattern of use includes at least one of date-time data, GPS location data, or accelerometer movement data.

At 408, the network connection is transferred from the first access point to the alternative access point when, at 406, at least one transfer criterion is satisfied based on at least one of the collected connection attribute or the collected access point attribute of the alternative access point. At 410, transfer feedback is collected after the network connection is transferred. Example transfer feedback includes at least one of post-transfer signal quality, transmission downtime, previous criterion adjustments, or a determined reason for access point failure.

At 412, the transfer criterion is updated based on the collected transfer feedback (e.g., using machine learning). At least one transfer criterion is updated on a per-user basis or a per-device basis.

FIG. 5 illustrates a flow chart of a method 500 of scanning alternative access points based on scan criteria, transferring a network connection to an alternative access point based on transfer criteria, and updating the scan criteria based on scan feedback and the transfer criteria based on transfer feedback according to an embodiment.

In an example, the method 500 operates to collect, at 502, at least one connection attribute associated with a network connection to a first access point. At 506, at least one access point attribute is collected from at least one alternative access point when, at 504, at least one scan criterion is satisfied based on the connection attribute. At 510, the network connection is transferred from the first access point to the alternative access point when, at 508, at least one transfer criterion is satisfied based on at least one of the connection attribute or the access point attribute. At 512, scan feedback is collected. At 514, the scan criterion is updated based on the collected scan feedback using, for example, one or more machine learning algorithms. At 516, transfer feedback is collected. At 518, the transfer criterion is updated based on the collected transfer feedback using, for example, one or more machine learning algorithms. It should be understood that if, at 504, no scan criterion is satisfied or if, at 508, no transfer criterion is satisfied, the method 500 returns to collecting connection attributes at 502.

In an example, scan criteria and/or transfer criteria are updated on at least on of per-device basis and/or a per-user basis.

It should be understood that the details and/or examples described above with respect to FIG. 1 may also be incorporated in examples of method 500.

Figure 6:
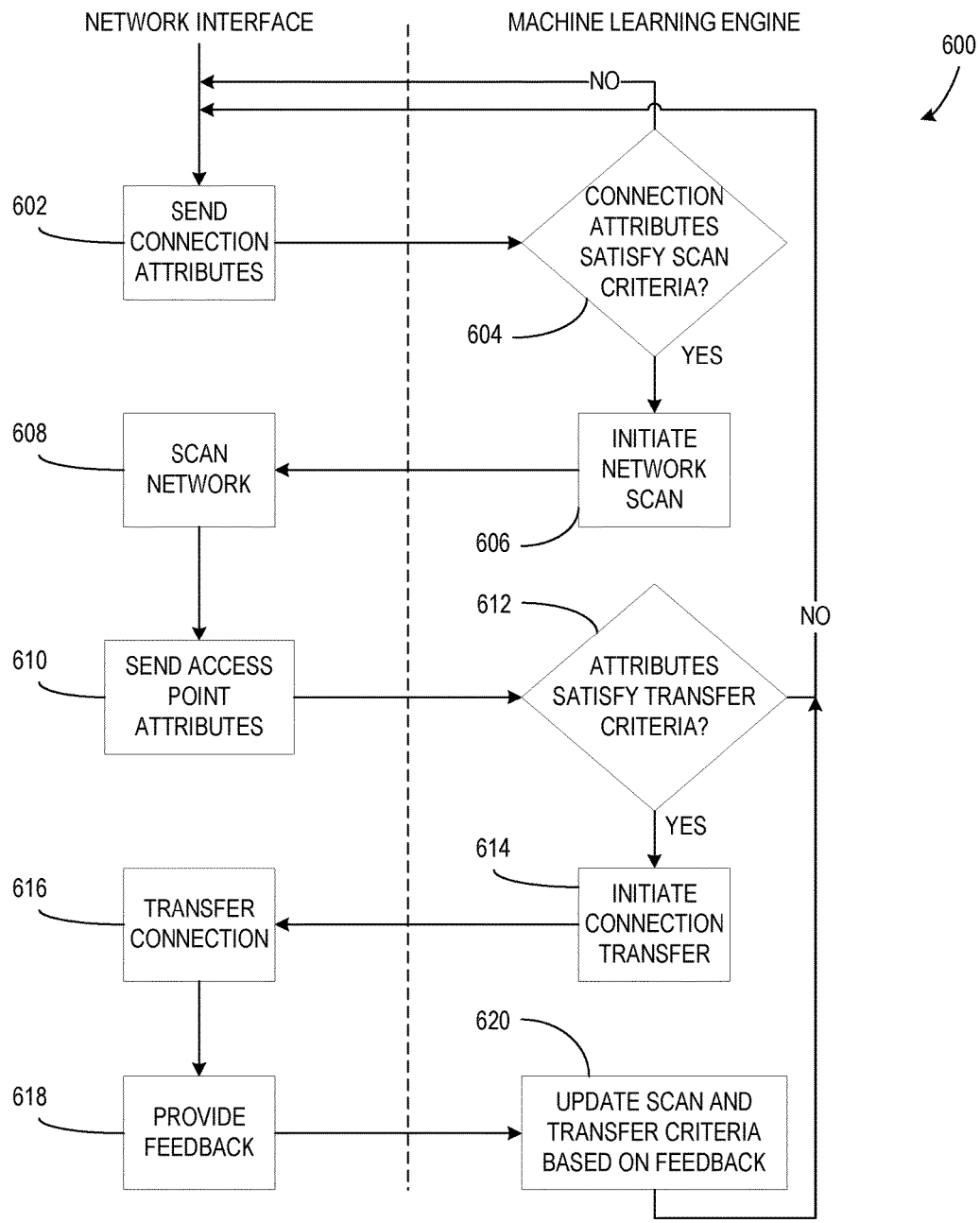
FIG. 6 illustrates an interaction diagram illustrating interactions between a network interface and a machine learning engine during scanning alternative access points based on scan criteria, transferring a network connection to an alternative access point based on transfer criteria, and updating the scan criteria based on scan feedback and the transfer criteria based on transfer feedback according to an embodiment.

FIG. 6 illustrates an interaction diagram 600 illustrating interactions between a network interface and a machine learning engine during scanning alternative access points based on scan criteria, transferring a network connection to an alternative access point based on transfer criteria, and updating the scan criteria based on scan feedback and the transfer criteria based on transfer feedback according to an embodiment.

At 602, the network interface may send connection attributes to the machine learning engine. At 604, the machine learning engine may receive the connection attributes and determine whether the received connection attributes satisfy scan criteria. If not, the machine learning engine may return to receiving connection attributes from the network interface. If the connection attributes do satisfy scan criteria, the machine learning engine may initiate a network scan at 606. The network interface receives instructions from the machine learning engine to scan the network and scans the network for alternative access points at 608.

While scanning for alternative access points, the network interface collects access point attributes of scanned access points and sends the access point attributes to the machine learning engine at 610. At 612, the machine learning engine determines whether the access point attributes and/or connection attributes received from the network interface satisfy transfer criteria. If not, the machine learning engine may return to receiving connection attributes from the network interface. If the access point attributes and/or connection attributes do satisfy transfer criteria, the machine learning engine initiates a connection transfer at 614. The network interface transfers the connection from one access point to another, according to instructions from the machine learning engine, at 616.

At 618, the network interface provides feedback associated with the scan and/or connection transfer to the machine learning engine. At 620, the machine learning engine updates scan and transfer criteria based on the received feedback from the network interface. In an example, the machine learning engine applies machine learning techniques and/or algorithms to the received feedback in order to determine updated scan and transfer criteria. Alternatively, or additionally, the machine learning engine may also use received connection attributes and access point attributes in determining updated scan and transfer criteria.

In an alternative example, the comparison on attributes against criteria may be done by the network interface, or by a connection manager component, or the like. The machine learning engine may simply receive input data/attributes and feedback data, determine updates and/or adjustments to criteria based on the received data, and provide the updated criteria to the network interface and/or connection manager component.

Further, a hybrid approach may be used, wherein some processing and/or comparisons are done by the connection manager or other component, while other processing and/or comparisons are done by the machine learning engine.

Figure 7:
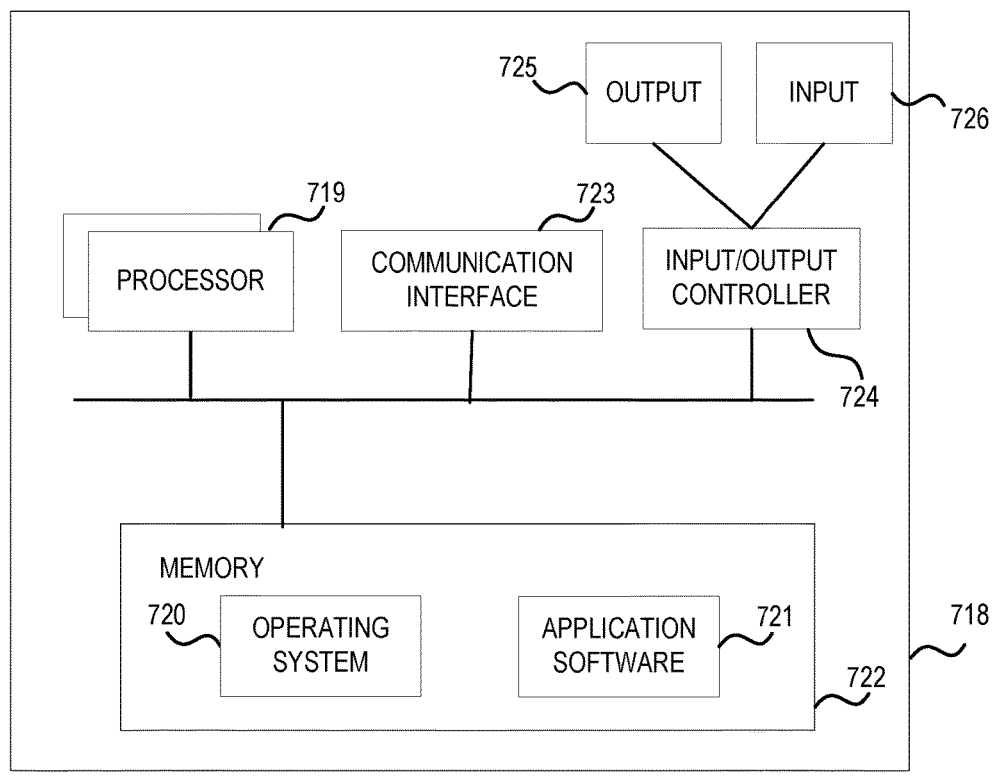
FIG. 7 illustrates a computing apparatus according to an embodiment as a functional block diagram.

FIG. 7 illustrates a computing apparatus 718 according to an embodiment as a functional block diagram. In an embodiment, components of a computing apparatus 718 may be implemented as a part of an electronic device and/or computing device according to one or more embodiments described in this specification. The computing apparatus 718 comprises one or more processors 719 which may be microprocessors, controllers or any other suitable type of processors for processing computer executable instructions to control the operation of the electronic device. Platform software comprising an operating system 720 or any other suitable platform software may be provided on the apparatus 718 to enable application software 721 to be executed on the device. According to an embodiment, determining when to scan for alternative access points and determining when to transfer a connection to an alternative access point based on collected data/attributes compared to defined criteria, and updating defined criteria based on collected feedback according to machine learning may be accomplished by software. Furthermore, it may receive network traffic from other computing devices via a network or other type of communication link. It may control the flow of network traffic to and from one or more access points based on the dynamically updated criteria as described herein.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g. using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone or a touchpad. In one embodiment, the output device 725 may also act as the input device. An example of such a device may be a touch sensitive display. The input/output controller 724 may also output data to devices other than the output device, e.g. a locally connected printing device.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, etc.

Alternatively, or in addition to the other examples described herein, examples include any combination of the following:

An electronic device comprising:
at least one network interface comprising a first network connection to a first access point;
at least one processor; and
at least one memory comprising computer program code, the at least one memory and the computer program code configured to, with the at least one processor, cause the electronic device to at least perform:
collect at least one connection attribute associated with the first network connection;
scan a second access point when at least one scan criterion is satisfied based on the collected at least one connection attribute, wherein scanning the second access point includes collecting at least one access point attribute from the second access point;
disconnect the first network connection from the first access point and form a second network connection from the at least one network interface to the second access point when at least one transfer criterion is satisfied based on at least one of the collected at least one connection attribute or the collected at least one access point attribute from the second access point;

update the at least one scan criterion based on scan feedback associated with scanning the second access point; and update the at least one transfer criterion based on transfer feedback associated with disconnecting the first network connection from the first access point and forming a second network connection from the at least one network interface to the second access point.

The electronic device described above, wherein updating the at least one scan criterion includes updating the at least one scan criterion according to machine learning and wherein updating the at least one transfer criterion includes updating the at least one transfer criterion according to machine learning.

The electronic device described above, wherein updating the at least one scan criterion includes updating the at least on scan criterion on at least one of a per-user basis or a per-device basis and wherein updating the at least one transfer criterion includes updating the at least one transfer criterion on at least one of a per-user basis or a per-device basis.

The electronic device described above, wherein the at least one connection attribute includes at least one of a signal strength, a signal latency, a CRC error rate, or a pattern of use.

The electronic device described above, wherein the at least one connection attribute includes a pattern of use and wherein the pattern of use includes at least one of date-time data, GPS location data, or accelerometer movement data.

The electronic device described above, wherein the at least one access point attribute from the second access point includes at least one of a signal strength, a signal latency, a CRC error rate, or a pattern of use.

The electronic device described above, wherein at least one of the scan feedback or the transfer feedback includes at least one of post-transfer signal quality, transmission downtime, previous criterion adjustments, or at least one determined reason for access point failure.

The electronic device described above, wherein the second access point is associated with the first access point based on a recorded history of the electronic device transferring network connections between the first access point and the second access point.

A computerized method comprising:

collecting at least one connection attribute associated with a network connection to a first access point;

scanning at least one alternative access point when at least one scan criterion is satisfied based on the collected at least one connection attribute;

collecting scan feedback after the at least one alternative access point is scanned; and updating the at least one scan criterion based on the collected scan feedback, wherein the at least one scan criterion is updated according to machine learning.

The computerized method described above, wherein updating the at least one scan criterion includes updating the at least one scan criterion on at least one of a per-user basis or a per-device basis.

The computerized method described above, wherein scanning at least one alternative access point includes scanning a plurality of alternative access points according to a scan pattern and wherein updating the at least one scan criterion based on the collected scan feedback includes updating the scan pattern based on the collected scan feedback.

The computerized method described above, wherein scanning a plurality of alternative access points according to a scan pattern includes scanning the plurality of alternative access points in a ranked order.

The computerized method described above, wherein the ranked order arranges the plurality of alternative access points from a least expensive cost access point to a most expensive cost access point.

The computerized method described above, wherein the ranked order arranges the plurality of alternative access points from a most reliable access point to a least reliable access point.

The computerized method described above, wherein a reliability of an access point of the plurality of alternative access points is determined based on a usage history of the access point.

One or more computer storage media having computer-executable instructions that, upon execution by a processor, cause the processor to at least:

collect at least one connection attribute associated with a network connection to a first access point;

collect at least one access point attribute from at least one alternative access point;

transfer the network connection from the first access point to the at least one alternative access point when at least one transfer criterion is satisfied based on at least one of the collected at least one connection attribute or the collected at least one access point attribute of the at least one alternative access point;

collect transfer feedback after the network connection is transferred; and update the at least one transfer criterion based on the collected transfer feedback, wherein the at least one transfer criterion is updated on at least one of a per-user basis or a per-device basis.

The one or more computer storage media described above, wherein updating the at least one transfer criterion includes updating the at least one transfer criterion according to machine learning.

The one or more computer storage media described above, wherein the at least one access point attribute includes at least one of a signal strength, a signal latency, a CRC error rate, or a pattern of use.

The one or more computer storage media described above, wherein the at least one access point attribute includes a pattern of use and wherein the pattern of use includes at least one of date-time data, GPS location data, or accelerometer movement data.

The one or more computer storage media described above, wherein the transfer feedback includes at least one of post-transfer signal quality, transmission downtime, previous criterion adjustments, or at least one determined reason for access point failure.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for determining when to scan for alternative access points and when to transfer a connection to an alternative access point based on defined criteria and for updating the defined criteria according to machine learning in order to improve the determination capabilities. The illustrated one or more processors 719 together with the computer program code stored in memory 722 constitute exemplary processing means for collecting data and/or attributes associated with current defined criteria and applying machine learning techniques to update the defined criteria in order to improve the scan and transfer determinations.

The term "comprising" is used in this specification to mean including the feature(s) or act(s) followed thereafter, without excluding the presence of one or more additional features or acts.

The invention claimed is:

1. An electronic device comprising:
   at least one network interface comprising a first network connection to a first access point;
   at least one processor; and
   at least one memory comprising computer program code, the at least one memory and the computer program code configured to, with the at least one processor, cause the electronic device to:
   collect at least one connection attribute associated with the first network connection;
   scan a second access point when at least one scan criterion is satisfied based on the collected at least one connection attribute, wherein scanning the second access point includes collecting at least one access point attribute from the second access point;
   disconnect the first network connection from the first access point and form a second network connection from the at least one network interface to the second access point when at least one transfer criterion is satisfied based on at least one of the collected at least one connection attribute or the collected at least one access point attribute from the second access point;
   update the at least one scan criterion based on scan feedback associated with scanning the second access point; and
   update the at least one transfer criterion based on transfer feedback associated with disconnecting the first network connection from the first access point and associated with forming the second network connection from the at least one network interface to the second access point, the at least one scan criterion being updated based on a pattern of use of the electronic device or a user of the electronic device to tune the at least one transfer criterion, wherein the update of at least one of (i) the at least one scan criterion or (ii) the at least one transfer criterion, includes performing the update according to machine learning to change an order of priority or a scan pattern of a plurality of access points, including at least the first and second access points, based at least in part on the pattern of use of the electronic device or the user of the electronic device.

2. The electronic device of claim 1, wherein updating the at least one scan criterion includes updating the at least one scan criterion according to machine learning; and wherein updating the at least one transfer criterion includes updating the at least one transfer criterion according to machine learning, wherein the pattern of use of the electronic device or the user of the electronic device comprises daily pattern information input to a machine learning engine to perform the machine learning, and wherein data collected by the machine learning engine is received from one or more device systems and used by the machine learning engine to determine the pattern of use of the electronic device or the user of the electronic device, the pattern of use determined based at least in part on (i) a day of a week or a day of a month, (ii) a time of day, (iii) a global location, or (iv) a detected motion including sustained motion of the electronic device.

3. The electronic device of claim 1, wherein the update of at least one of (i) the at least one scan criterion or (ii) the at least one transfer criterion includes performing the update according to machine learning, wherein updating the at least one scan criterion includes updating the at least one scan criterion on at least one of a per-user basis or a per-device basis to tune the at least one scan criterion to fit a pattern of usage of the electronic device of the user of the electronic device, wherein updating the at least one transfer criterion includes updating the at least one transfer criterion on at least one of a per-user basis or a per-device basis, and wherein the machine learning is configured to receive a rating of a performance of the first network connection or the second network connection around a time as the at least one network interface is scanning for alternative access points or transferring a connection to an alternative access point, and use the received rating to update the at least one scan criterion or the at least one transfer criterion.

4. The electronic device of claim 1, wherein the at least one connection attribute includes at least one of a signal strength, a signal latency, an error rate, a connected access point load, throughput, transport layer statistics, application layer statistics, or a pattern of use.

5. The electronic device of claim 4, wherein the pattern of use includes at least one of date-time data, location data, or accelerometer movement data.

6. The electronic device of claim 1, wherein the at least one access point attribute from the second access point includes at least one of a signal strength, a signal latency, an error rate, or a pattern of use, and wherein the updating of the at least one scan criterion comprises tuning a determination of the access points to be scanned by the electronic device or the access points between which the electronic device can transfer based on the pattern of use.

7. The electronic device of claim 1, wherein at least one of the scan feedback or the transfer feedback includes at least one of post-transfer signal quality, transmission downtime, previous criterion adjustments, scan duration, throughput, latency, transport layer statistics, application layer statistics, or at least one determined reason for access point failure.

8. The electronic device of claim 1, wherein the second access point is associated with the first access point based on a recorded history of the electronic device transferring network connections between the first access point and the second access point.

9. A computerized method comprising:
   collecting at least one connection attribute associated with a network connection to a first access point;
   scanning at least one alternative access point when at least one scan criterion is satisfied based on the collected at least one connection attribute;

collecting scan feedback after the at least one alternative access point is scanned; and updating the at least one scan criterion of an electronic device based on the collected scan feedback, wherein the at least one scan criterion is updated according to machine learning and based on a pattern of use of the electronic device or a user of the electronic device to tune at least one transfer criterion, and wherein the updating further comprises performing the updating according to the machine learning to change an order of priority or a scan pattern of a plurality of access points, including at least the first access point and the least one alternative access point, based at least in part on the pattern of use of the electronic device or the user of the electronic device.

10. The computerized method of claim 9, wherein updating the at least one scan criterion includes updating the at least one scan criterion on at least one of a per-user basis or a per-device basis, and wherein the machine learning is configured to update the at least one scan criterion to balance collecting data in order to determine one of a best scan or a best connection transfer against a resource cost of performing the update.

11. The computerized method of claim 9, wherein scanning at least one alternative access point includes scanning a plurality of alternative access points according to a scan pattern; and wherein updating the at least one scan criterion based on the collected scan feedback includes updating the scan pattern based on the collected scan feedback, and wherein the machine learning is configured to receive a rating of a performance of the network connection around a time when the network interface is scanning for alternative access points or transferring a connection to an alternative access point, and use the received rating to update the at least one scan criterion.

12. The computerized method of claim 11, wherein scanning a plurality of alternative access points according to a scan pattern includes scanning the plurality of alternative access points in a ranked order.

13. The computerized method of claim 12, wherein the ranked order arranges the plurality of alternative access points from a least expensive cost access point to a most expensive cost access point.

14. The computerized method of claim 12, wherein the ranked order arranges the plurality of alternative access points from a most reliable access point to a least reliable access point, wherein a reliability of an access point is determined based on an operating characteristic of the access point.

15. The computerized method of claim 14, wherein a reliability of an access point of the plurality of alternative access points is determined based on a usage history of the access point.

16. One or more computer storage media having computer-executable instructions that, upon execution by a processor, cause the processor to at least:

collect at least one connection attribute associated with a network connection to a first access point;

collect at least one access point attribute from at least one alternative access point;

transfer the network connection from the first access point to the at least one alternative access point when at least one transfer criterion is satisfied based on at least one of the collected at least one connection attribute or the collected at least one access point attribute of the at least one alternative access point;

collect transfer feedback after the network connection is transferred; and update the at least one transfer criterion based on the collected transfer feedback, wherein the at least one transfer criterion is updated on at least one of a per-user basis pattern of use of an electronic device or a per-device basis pattern of use of the electronic device to tune the at least one transfer criterion, and wherein the update includes performing the update according to machine learning to change an order of priority or a scan pattern of a plurality of access points, including at least the first access point and the at least one alternative access point, based at least in part on the pattern of use of the electronic device or the user of the electronic device.

17. The one or more computer storage media of claim 16, wherein updating the at least one transfer criterion includes updating the at least one transfer criterion according to machine learning.

18. The one or more computer storage media of claim 16, wherein the at least one access point attribute includes at least one of a signal strength, a signal latency, a CRC error rate, or a pattern of use.

19. The one or more computer storage media of claim 18, wherein the at least one access point attribute includes a pattern of use; and wherein the pattern of use includes at least one of date-time data, GPS location data, or accelerometer movement data.

20. The one or more computer storage media of claim 16, wherein the transfer feedback includes at least one of post-transfer signal quality, transmission downtime, previous criterion adjustments, or at least one determined reason for access point failure.

* * * * *